Dec. 17, 1946.  P. J. GRABASH  2,412,884
AIRPLANE WHEEL TURNING DEVICE
Filed Dec. 28, 1945  2 Sheets-Sheet 1
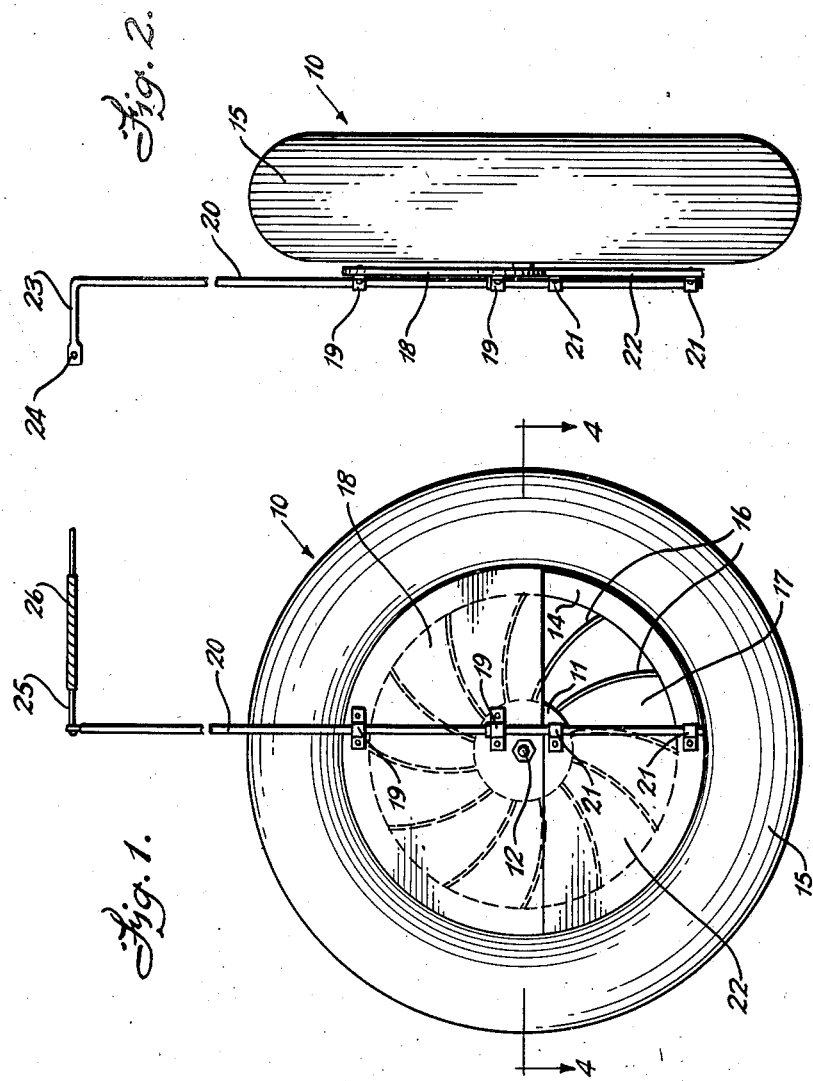
Inventor
PETER J. GRABASH
By *Clarence A. O'Brien
and Harvey B. Jacobson*
Attorneys Dec. 17, 1946. P. J. GRABASH 2,412,884
AIRPLANE WHEEL TURNING DEVICE
Filed Dec. 28, 1945 2 Sheets-Sheet 2
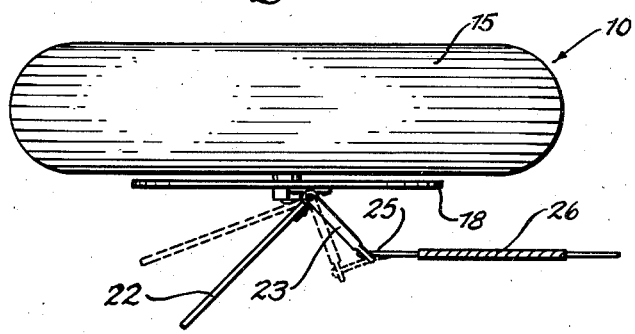
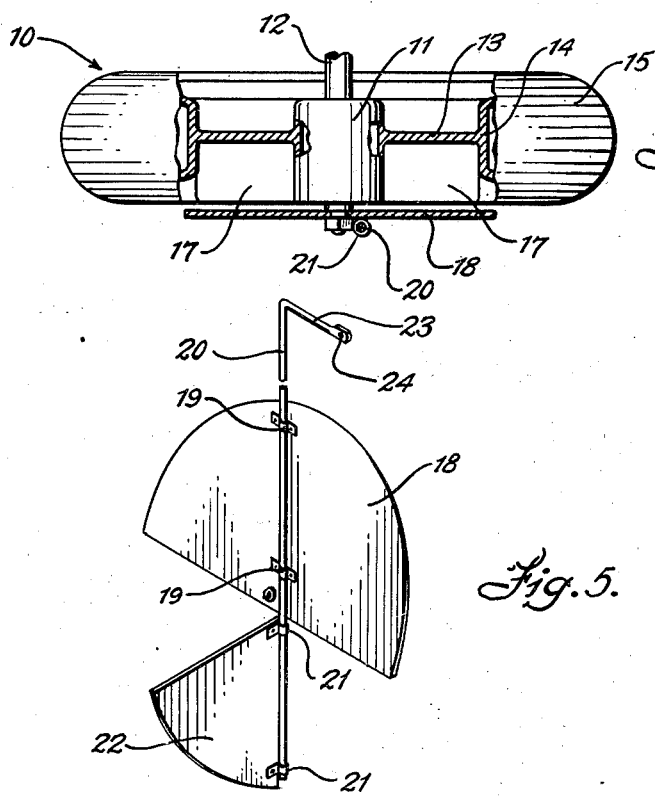
Inventor
PETER J. GRABASH
By *Clarence A. O'Brien and Harvey B. Jacobson*
Attorneys Patented Dec. 17, 1946

2,412,884

UNITED STATES PATENT OFFICE 2,412,884

AIRPLANE WHEEL TURNING DEVICE

Peter J. Grabash, Middletown, Pa.

Application December 28, 1945, Serial No. 637,640

3 Claims. (Cl. 244—103)

This invention relates to an airplane wheel turning device and has for its object to initiate rotation of the wheels of an airplane prior to the landing of the craft, to thereby aid in the smooth contact of the plane with the runway.

Another object is to utilize the pressure of the atmosphere to initiate the rotation of the landing wheels.

The above and other objects may be attained by employing this invention which embodies among its features an airplane wheel carrying between the hub and the rim a plurality of vanes, a cover plate covering at least the upper half of one side of the wheel, and a deflector pivotally supported on the cover plate in a position to cover the lower forward half of the remainder of the wheel.

Other features include means for adjusting the deflector into various positions in order to direct air against the vanes as the airplane advances toward a landing strip.

In the drawings:

Figure 1 is a side view of a landing wheel embodying the features of this invention, Figure 2 is an edge view of Figure 1, Figure 3 is a top plan view of Figure 1, Figure 4 is a horizontal sectional view taken substantially along the line 4—4 of Figure 1, and Figure 5 is a perspective view of the cover plate and deflector.

Referring to the drawings in detail an airplane wheel designated generally 10 comprises the usual hub 11 mounted for rotation on a shaft 12 and a disc or web 13 which extends concentrically around the hub 11 and carries at its periphery a rim 14 on which a conventional tire 15 is mounted. Extending between the hub 11 and the rim 14 and opening outwardly through one side of the wheel 10 are vanes 16 which extend in a generally radial direction though they are preferably curved as illustrated in Figure 1 to form pockets 17 in conjunction with the web or disc 13 previously described.

Mounted on the outer end of the shaft 12 is a plate 18 which is substantially semi-circular in plan and is designed to cover the upper half of the wheel as will be readily understood upon reference to Figure 1. Supported in suitable brackets 19 carried by the outer face of the plate 18 is a vertically extending shaft 20 the lower end of which projects below the bottom edge of the plate and carries clips 21 to which a segmental deflector plate 22 is attached, it being understood that the clips 21 are so attached to the shaft 20 as to rotate therewith. Formed at the upper end of the shaft 20 is an angular extension or arm 23 the free end of which is flat and pierced with an opening 24 into which the end 25 of a flexible shaft 26 is riveted or otherwise rigidly fixed. The end of the flexible shaft 26 opposite that connected to the arm 23 is led upwardly into the cockpit of the plane to which the device is attached and is preferably conveniently located on the instrument board (not shown) within easy reach of the pilot.

The operation of the device is more or less obvious, it being understood that by rotating the shaft 20 through the medium of the arm 23 and flexible shaft 26 the deflector 22 may be moved into various positions to either close the forward bottom portion of the wheel entirely or to deflect air against the vanes 16 and cause it to enter the pockets 17 to set the wheel in motion, it being understood that the air escapes toward the rear through the uncovered portion of the wheel.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. The combination with an airplane wheel, of a plurality of vanes carried by the wheel between its hub and its rim, a fixed cover plate enclosing one upper half of the side of the wheel, and a segmental deflector carried by the cover plate and adapted to close a portion of the lower half of the wheel.

2. The combination with an airplane wheel, of a plurality of vanes carried by the wheel between its hub and its rim, a fixed cover plate enclosing the upper half of one side of the wheel, a segmental deflector carried by the cover plate and adapted to close a portion of the lower half of the wheel and means to move the deflector to open position to direct air against the vanes to rotate the wheel.

3. An airplane wheel rotating device comprising the combination with an airplane wheel carrying a plurality of vanes, of a fixed cover covering at least the upper half of one side of the wheel and a segmental deflector carried by the cover plate and adapted to close at least one half of the lower half of the wheel.

PETER J. GRABASH.